United States Patent
Sharma et al.

(10) Patent No.: US 9,109,494 B2
(45) Date of Patent: Aug. 18, 2015

(54) AIR INJECTION TIMED WITH EXHAUST RELEASE

(75) Inventors: Manish Sharma, Inkster, MI (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 764 days.

(21) Appl. No.: 13/368,230

(22) Filed: Feb. 7, 2012

(65) Prior Publication Data
US 2013/0199497 A1 Aug. 8, 2013

(51) Int. Cl.
| F01N 3/22 | (2006.01) |
| F01N 3/32 | (2006.01) |
| F01N 3/34 | (2006.01) |
| F01L 1/053 | (2006.01) |

(52) U.S. Cl.
CPC .. *F01N 3/32* (2013.01); *F01N 3/22* (2013.01); *F01N 3/34* (2013.01); *F01L 1/0532* (2013.01); *F01L 2001/0537* (2013.01); *Y02T 10/20* (2013.01)

(58) Field of Classification Search
CPC .............. F01N 3/22; F01N 3/32; F01N 3/34; F01N 3/222; Y02T 10/121
USPC ...................... 60/289, 294, 304, 305; 123/434
See application file for complete search history.

(56) References Cited

U.S. PATENT DOCUMENTS

| 3,641,767 | A  | * | 2/1972 | Kraus et al. | 60/274 |
| 5,832,725 | A  | * | 11/1998 | Sim | 60/289 |
| 6,640,539 | B1 | * | 11/2003 | Lewis et al. | 60/284 |
| 6,978,600 | B2 | * | 12/2005 | Hirooka | 60/289 |
| 7,231,760 | B2 | * | 6/2007 | Busch | 60/280 |
| 7,987,664 | B2 | * | 8/2011 | Araki et al. | 60/305 |
| 8,087,237 | B2 | * | 1/2012 | Komuro | 60/289 |
| 8,333,067 | B2 | * | 12/2012 | Araki et al. | 60/304 |
| 8,429,896 | B2 | * | 4/2013 | Pekrul et al. | 60/282 |
| 2012/0210712 | A1 | * | 8/2012 | Wu et al. | 60/611 |
| 2013/0019593 | A1 | * | 1/2013 | Jacques et al. | 60/605.1 |

FOREIGN PATENT DOCUMENTS

EP            2016261 B1    5/2011

* cited by examiner

*Primary Examiner* — Thomas Moulis
*Assistant Examiner* — Elizabeth Hadley
(74) *Attorney, Agent, or Firm* — Julia Voutyras; Alleman Hall McCoy Russell & Tuttle LLP

(57) ABSTRACT

Embodiments for injecting air into exhaust ports of an engine are provided. In one example, a multi-cylinder engine method comprises combusting a rich air-fuel mixture, injecting air into a first cylinder's exhaust port and not into a second cylinder's exhaust port during the first cylinder's exhaust stroke, and injecting air into the second cylinder's exhaust port and not into the first cylinder's exhaust port during the second cylinder's exhaust stroke. In this way, injection into each exhaust port may be timed with exhaust release into each exhaust port.

18 Claims, 4 Drawing Sheets

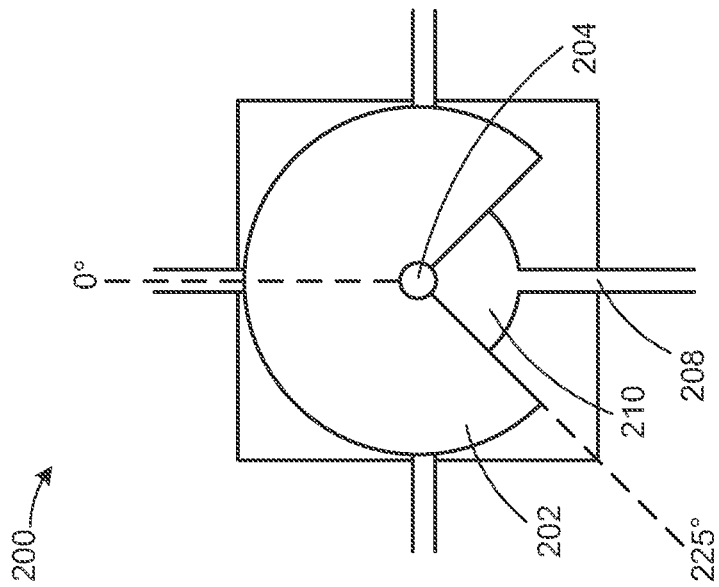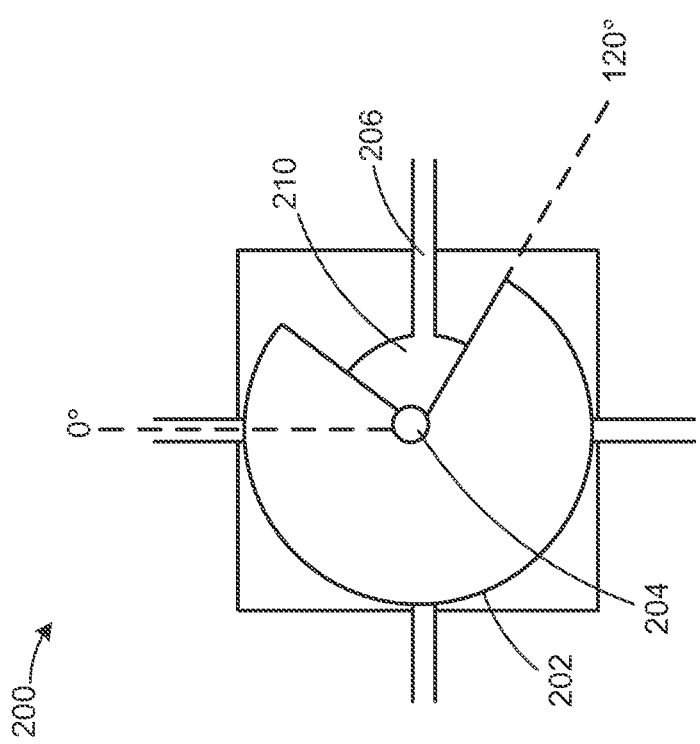

AIR INJECTION TIMED WITH EXHAUST RELEASE

FIELD

The present disclosure relates to an air injection system for an engine exhaust.

BACKGROUND AND SUMMARY

To reduce exhaust emissions, vehicles are fitted with one or more emission control devices, such as catalytic converters. These devices frequently utilize rapid heating to a light-off temperature in order to function optimally. Various approaches have been to taken to rapidly heat the emission control devices. In one example, the engine may be operated at a rich air-fuel ratio. Uncombusted hydrocarbons remaining in the exhaust may react with secondary air injected into the exhaust manifold to produce additional heat in the exhaust upstream of the emission control devices.

European Patent No. EP2016261 discloses a secondary air injection pump that injects air into an exhaust port. However, in a multi-cylinder, four-stroke engine, the exhaust is pulsed and hence the exhaust ports do not release exhaust gases at the same time. Thus, the exhaust ports releasing exhaust gases have a higher backpressure than the exhaust ports not releasing exhaust gas. During secondary air injection, this may result in the exhaust ports releasing exhaust gases receiving less secondary air than the exhaust ports not releasing exhaust gases.

The inventors have recognized the issues with the above approach and offer a system to at least partly address them. In one embodiment, a multi-cylinder engine method comprises combusting a rich air-fuel mixture, injecting air into a first cylinder's exhaust port and not into a second cylinder's exhaust port during the first cylinder's exhaust stroke, and injecting air into the second cylinder's exhaust port and not into the first cylinder's exhaust port during the second cylinder's exhaust stroke.

In this way, each exhaust port may receive an injection of secondary air (or other oxidizing agents) only when that port is releasing exhaust gas. The amount of secondary air needed for efficient reaction with the hydrocarbons in the exhaust may be provided equally for all ports, eliminating unnecessary air injection.

In one example, the injected air may be provided via an air pump that includes a rotating disc mechanically timed to the engine's camshaft. By only injecting air into each port during that port's exhaust release, a smaller air pump or air source may be used that utilizes less energy, thus improving overall engine fuel economy. Further, as the rotating disc of the air pump may be coupled to the camshaft to control the air injection to each port, the control strategy of the air pump and injection into the ports may be simplified. Also, the use of thermally resistant control valves at each port may be eliminated, reducing costs, if desired.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2A and 2B schematically show an air injection system including a rotating disc and plurality of connections according to an embodiment of the present disclosure.

DETAILED DESCRIPTION

Figure 1:
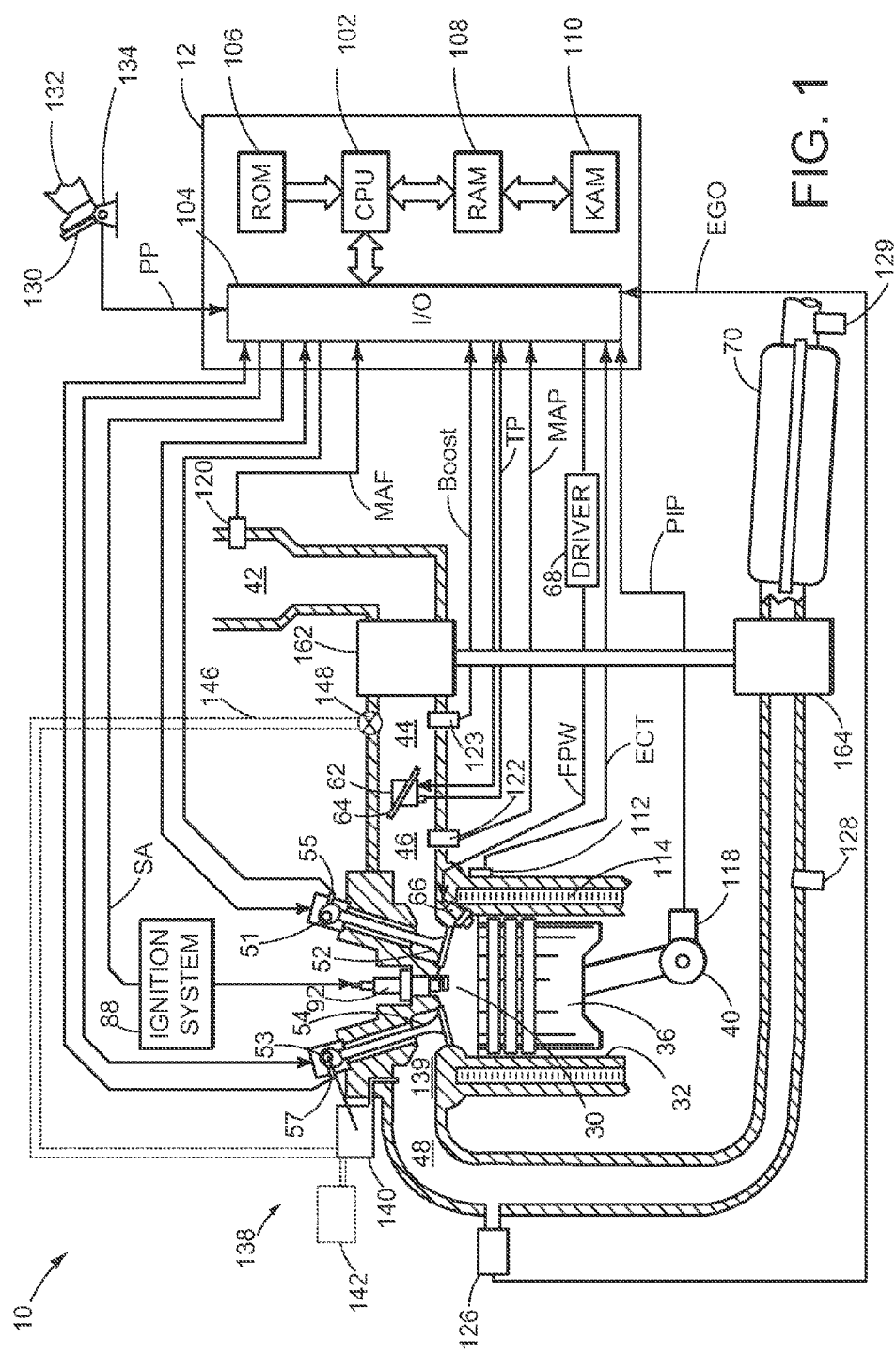
FIG. 1 is a schematic diagram of an engine.

The present description relates to systems and methods for operating an air injection system of an internal combustion engine. In one non-limiting example, the engine may be configured as illustrated in FIG. 1. Further, various examples of the air injection system as illustrated in FIGS. 2A-B may be part of the engine of FIG. 1.

Figure 3:
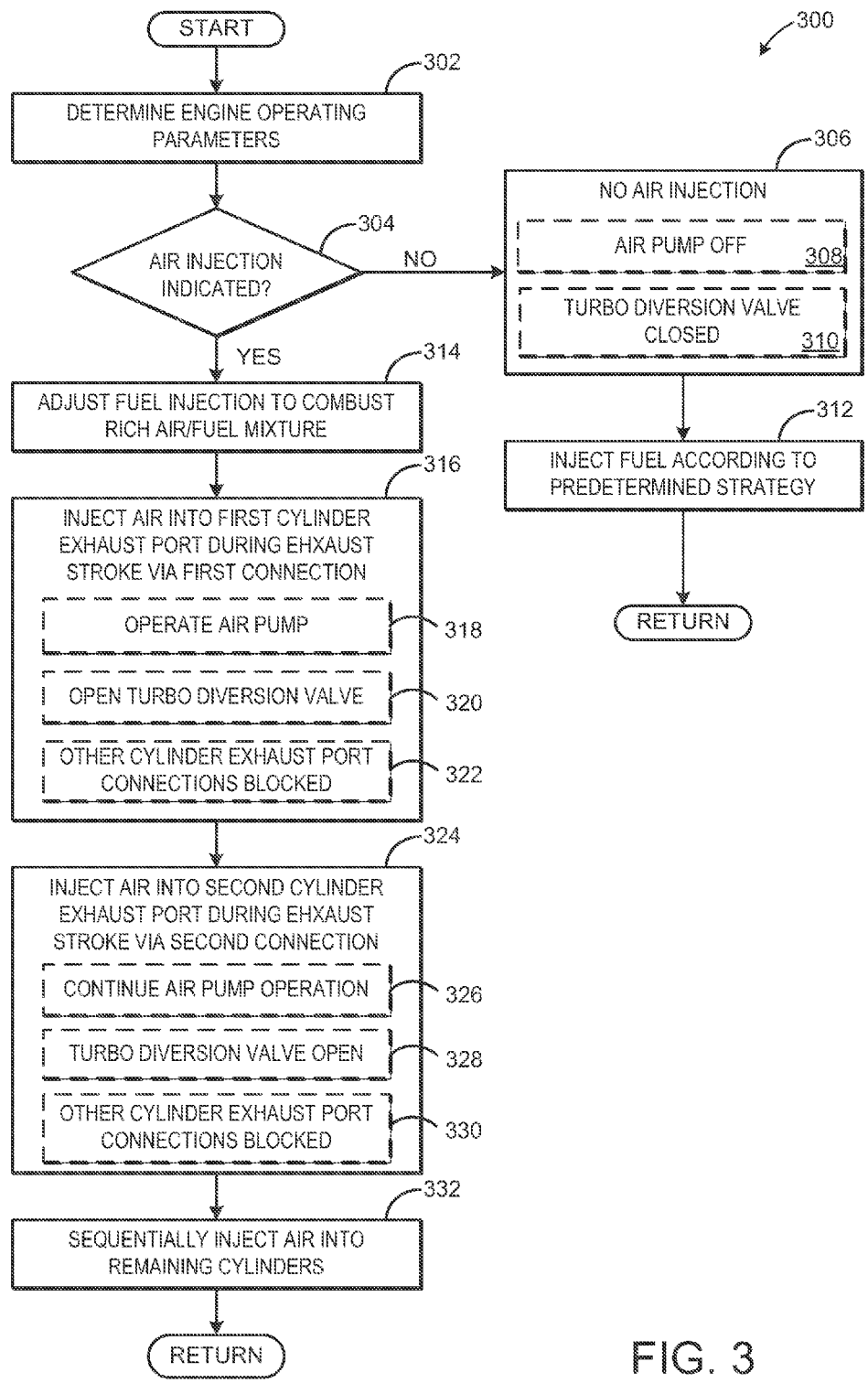
FIG. 3 is a flow chart illustrating an example method for injecting air according to an embodiment of the present disclosure.
Figure 4:
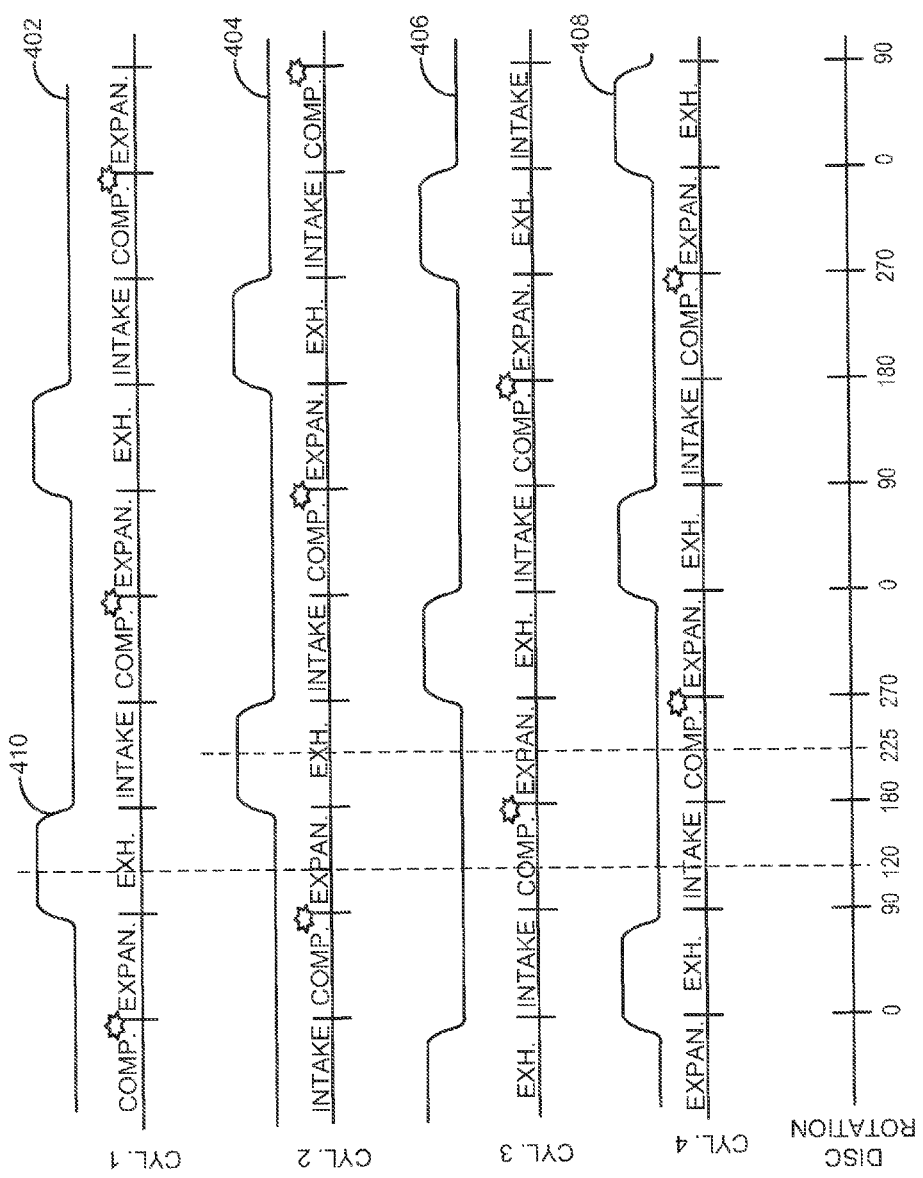
FIG. 4 is an example plot of air injection during operation of a four cylinder engine.

Air injection may be provided according to the system depicted in FIGS. 2A-2B and the method illustrated in FIG. 3, which shows an example method for injecting air. FIG. 4 illustrates air injection during engine operation according the method of FIG. 3.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake passage 44 in a configuration that provides what is known as port injection of fuel into the intake port upstream of combustion chamber 30.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Engine 10 may further include a compression device such as a turbocharger or supercharger including at least a compressor 162 arranged along intake manifold 44. For a turbocharger, compressor 162 may be at least partially driven by a turbine 164 (e.g. via a shaft) arranged along exhaust passage 48. One or more of a wastegate and a compressor bypass valve may also be included to control flow through the turbine and compressor. For a supercharger, compressor 162 may be at least partially driven by the engine and/or an electric machine, and may not include a turbine. Thus, the amount of compression provided to one or more cylinders of the engine via a turbocharger or supercharger may be varied by controller 12.

An air injection system 138 may inject secondary air into the exhaust port 139 of cylinder 30. The air injection system 138 may include an air injector 140 configured to sequentially inject air into each exhaust port of each cylinder of engine 10. The air injector 140 may include a plurality of connections, each connection coupled to an exhaust port. The air injector 140 may control air injection via a mechanical coupling with the camshaft of cam actuation system 53. In one example, the mechanical coupling may include a rotating disc (not shown in FIG. 1) configured to open a connection between the air injector 140 and the exhaust port 139 during the exhaust stroke of cylinder 30, and block the connection during other times. In this way, the air injection into an exhaust port may be timed with the exhaust release in the exhaust port.

In one embodiment, the air injector may be supplied with pressurized air via an air pump 142, which may include on and off states regulated by controller 12. In another embodiment, the air injector 140 may be supplied with pressurized air via a passageway 146 that diverts intake air downstream of turbocharger compressor 162. The passageway 146 may be opened and closed by a turbocharger diversion valve 148 that is controlled by controller 12. While air injector 140 and air pump 142 are depicted in FIG. 1 as being separate components, it is to be understood that in some embodiments, air injector 140 and air pump 142 may be integrated into a single device.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and that each cylinder may similarly include its own set of intake/exhaust valves, fuel injector, spark plug, etc.

FIGS. 2A and 2B schematically show an example air injection system 200. Air injection system 138 of FIG. 1 is one non-limiting example of air injection system 200. Air injection system 200 includes a rotating disc 202 and a camshaft coupling 204. The rotating disc may include a cut-out to enable a connection between the air injection system and an exhaust port of a cylinder. As explained above, the rotating disc 202 may be coupled to the camshaft of the engine, such that the rotation of the disc may be timed to the opening of each exhaust valve of each cylinder of the engine. The air injection system 200 may also include a pressurized air supply 210 to supply air to the plurality of connections of the air injection system. The pressurized air supply 210 may include air generated by an air pump or may include air diverted downstream of a compressor. If the pressurized air supply 210 includes air generated by an air pump, the air pump may be included with the rotating disc 202, camshaft coupling 204, and connections in a single device, or the air pump may be separate.

FIG. 2A shows the rotating disc 202 in a first position whereby the rotating disc 202 has rotated 120° from a starting position of 0°, as determined by a leading edge of the cut-out. As such, a connection 206 between the air injection system and a first cylinder's exhaust port is open. All other connections between the air injection system and exhaust ports of other cylinders are blocked. FIG. 2B shows the rotating disc in a second position whereby the rotating disc 202 has rotated 225° from the starting position, such that a connection 208 between the air injection system and a second cylinder's exhaust port is open; the connection 206, as well as the other two connections, is blocked.

As depicted in FIGS. 2A and 2B, the connections 206 and 208 between the air injector and exhaust ports are connections created by the cut-out opening in the rotating disc. However, in some embodiments, the connections could be provided by one or more valves coupled to the camshaft, or other suitable mechanism for timing the connection of the air injection system to each exhaust port during each respective cylinder's exhaust stroke. The connections are air connections/passageway connections that allow communication of air only during a selected duration (e.g., during an exhaust stroke) and are otherwise blocked, again with the timing of the blocking also being timed to the camshaft. While the rotating disc 202 is depicted in FIGS. 2A and 2B as including a cut-out section to enable opening of each connection, this is a non-limiting example, and other configurations of the rotating disc that open one connection while blocking other connections are within the scope of this disclosure.

Further, while four connections are depicted, other connections are possible, such as six connections or eight connections. The number of connections may be equal to the number of cylinders in the engine, or may be equal to the number of cylinders in a cylinder bank. In some embodiments, the cylinders may include more than one exhaust port. In such circumstances, each connection may open out to multiple passageways to inject air into all the exhaust ports of a single cylinder at one time. In other embodiments, each exhaust port may have its own connection with the air injection system, and the arrangement of the connections and size of the cut-out opening may determine the duration of air injection into each exhaust port. For example, if each cylinder has two exhaust ports, the connections for the exhaust ports of one cylinder may be arranged in close proximity to each other so that each exhaust port receives substantially the same duration and timing of air injection. In another example, the exhaust port connections of a single cylinder may be spaced apart from each other and the cut-out opening may be sized such that one exhaust port receives air injection during a first half of the exhaust stroke while the other exhaust port receives air injection during the second half of the exhaust stroke. Other connection configurations are within the scope of this disclosure.

FIG. 3 illustrates a method 300 for injecting air in a multi-cylinder engine. Method 300 may be carried out by instructions stored in the memory of controller 12. At 302, method 300 includes determining engine operating parameters. Engine operating parameters may include engine speed, engine load, engine temperature, exhaust gas temperature, a temperature of one or more emission control devices located in the exhaust, etc. At 304, it is determined if air injection into one or more exhaust ports of the engine is indicated. As explained previously, air may be injected into the exhaust ports of the engine in order to induce rapid heating of the exhaust and thus rapid heating of the emission control devices positioned in the exhaust system. Air injection may be indicated if engine temperature is below a threshold, such as below warmed-up engine temperature, if exhaust gas temperature is below a threshold, if emission control device temperature is below a threshold, such as below a light-off temperature, etc. Further, in some embodiments, if an exhaust gas sensor indicates the exhaust from the engine is richer than stoichiometry or richer than a desired air/fuel ratio, air may be injected to combust excess hydrocarbons present in the exhaust.

If air injection is not indicated, for example if the emission control device is at or above light-off temperature, method 300 proceeds to 306, where no air is injected. No air injection may include turning off or maintaining an air pump, such as pump 142, in an off state at 308. In other embodiments, no air injection may include closing a turbo diversion valve, such as valve 148, to block the diversion of compressed air to the air injection system at 310. At 312, fuel is injected according to a predetermined strategy (e.g., based on engine speed and load, based on feedback from one or more exhaust gas sensors, etc.), and then method 300 returns.

If air injection is indicated, for example if the temperature of the emission control device is below light-off temperature, method 300 proceeds to 314 to adjust fuel injection so the engine combusts a rich air/fuel mixture. This may include increasing a fuel injection amount, retarding spark ignition timing, and/or other adjustments. At 316, air is injected into a first cylinder's exhaust port during the first cylinder's exhaust stroke via a first connection of the air injection system. This may include operating the air pump at 318. As explained above with reference to FIG. 1, the air pump may include a rotating disc that is coupled to the camshaft of the engine. The rotating disc may open the first connection during the exhaust stroke of the first cylinder so that pressurized air may be injected into the first cylinder's exhaust port. However, in embodiments where the pressurized air is generated by diverting compressed air downstream of a turbocharger compressor, injecting the air may include opening the turbo diversion valve at 320. In this way, pressurized air downstream of the compressor may be routed to the air injection system and injected into the first cylinder's exhaust port. Further, a turbocharger wastegate may be adjusted, e.g., closed, during the diverting to maintain desired turbocharger operation. At 322, injecting air includes blocking the connections with the exhaust ports of the remaining cylinders. Thus, only the exhaust port of the first cylinder receives injected air.

At 324, method 300 includes injecting air into a second cylinder's exhaust port during the exhaust stroke of the second cylinder via a second connection of the air injection system. Upon completion of the first cylinder's exhaust stroke and beginning of the second cylinder's exhaust stroke, the air injection system may end injection into the exhaust port of the first cylinder and instead inject air into the exhaust port of the second cylinder. The air injection into the second cylinder's exhaust port may include continuing operation of the air pump 326 or maintaining the turbo diversion valve open at 328. The air injection into the second cylinder's exhaust port also includes blocking the connection between the air injection system and the other cylinders' exhaust ports (including the connection with the first cylinder's exhaust port) at 330.

At 332, method 300 includes sequentially injecting air into the exhaust ports of any remaining cylinders, similar to the air injections performed into the exhaust ports of the first and second cylinders. Method 300 then returns.

Thus, method 300 of FIG. 3 provides for a multi-cylinder engine method including combusting a rich air-fuel mixture, injecting air into a first cylinder's exhaust port and not into a second cylinder's exhaust port (and not into any other cylinder's exhaust port) during the first cylinder's exhaust stroke, and injecting air into the second cylinder's exhaust port and not into the first cylinder's exhaust port (and not into any other cylinder's exhaust port) during the second cylinder's exhaust stroke. In some embodiments, this may include injecting air into the first cylinder's exhaust port only during the first cylinder's exhaust stroke, and injecting air into the second cylinder's exhaust port only during the second cylinder's exhaust stroke. Further, in some embodiments, the method may include injecting air into the first cylinder's exhaust port and not injecting air into exhaust ports of other cylinders that are not undergoing an exhaust stroke, and injecting air into the second cylinder's exhaust and not injecting air into exhaust ports of other cylinders that are not undergoing an exhaust stroke.

In this way, air may be sequentially injected into the exhaust port of each cylinder of an engine during each cylinder's exhaust stroke. By doing so, air may be injected only when exhaust gas is released from the cylinder, avoiding unnecessary air injection events and equalizing injection among all cylinders.

Referring to FIG. 4, an example plot of a simulated engine operation is shown. Time begins on the left side of the plot and increases to the right side of the plot. The illustrated sequence represents an operation of a non-limiting four cylinder four cycle engine. The illustrated sequence may occur at the beginning of engine operation, in the middle, or at the end. In this example, the vertical markers between cylinder position traces CYL. 1-4, represent top-dead-center or bottom-dead-center for the respective cylinder strokes, and there are 180 crankshaft degrees between each vertical marker. Cylinders 1-4 each go through intake, compression, expansion, and exhaust strokes during a cycle of the cylinder.

The first plot from the top of the figure represents position of cylinder number one. And, in particular, the stroke of cylinder number one as the engine crankshaft is rotated. Each stroke may represent 180 crankshaft degrees. Therefore, for a four stroke engine, a cylinder cycle may be 720°, the same crankshaft interval for a complete cycle of the engine. The stars indicate the ignition events for the combustion events. The ignition may be initiated by a spark plug or by compression. In this sequence, cylinder number one valves are open for at least a portion of the intake stroke to provide air to the cylinder. Fuel may be injected to the engine cylinders by port or direct injectors. The fuel and air mixture is compressed and ignited during the compression stroke. The exhaust valves are open during at least a part of the exhaust stroke to release combustion gases to the exhaust system.

The second cylinder position trace from the top of the figure represents the position and stroke for cylinder number two. Similar to the cylinder position trace for cylinder one, the stars represent ignition events, and fuel is injected to form a fuel air mixture that is compressed and ignited during the compression stoke. The exhaust valves open during the exhaust stroke. The third cylinder position trace from the top of the figure represents the position and stroke for cylinder number three. The fourth cylinder position trace from the top of the figure represents the position and stroke for cylinder number four. While the cylinders are represented as firing in an order of 1-2-3-4, it is to be understood that this is a non-limiting example, and that the cylinders may fire in another suitable order.

Above each cylinder plot is a representation of example air injection into an exhaust port associated with that cylinder. For example, air injection plot 402 depicts the air injection into an exhaust port of cylinder one. Air injection plot 404 depicts the air injection into an exhaust port of cylinder two, air injection plot 406 depicts the air injection into an exhaust port of cylinder three, and air injection plot 408 depicts the air injection into an exhaust port of cylinder four.

Referring to the first cylinder trace, during the exhaust stroke, the exhaust valve opens, and exhaust is released from the exhaust port of cylinder one to the exhaust system. The air injection 410 into the exhaust port of cylinder one occurs substantially during the exhaust stroke of cylinder one. While the injection is depicted as occurring during the entirety of the exhaust stroke, in some embodiments, the injection may occur only during a part of the exhaust stroke, such as during the first half, second half, etc. For each cylinder, air is injected into that cylinder's exhaust port during that cylinder's exhaust stroke via connection with the air pump. The connection with the air pump may be controlled via a rotating disc, which rotates according to the example disc rotation plot depicted at the bottom of FIG. 4. The example disc rotation plot is oriented similar to the disc rotation described with respect to FIGS. 2A and 2B, with 0° being a starting position for the leading edge of the cut-out opening of the disc, with rotation in a counter-clockwise direction. For example, when the leading edge of the cut-out has rotated 120°, the disc is in the first position of FIG. 2A where the connection between the air injection system and the exhaust port of cylinder one is open and all other connections are blocked. At 225°, the disc has rotated to the second position of FIG. 2B where the connection between the air injection system and the exhaust port of cylinder two is open and all other connections are blocked.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A multi-cylinder engine method, comprising:
combusting a rich air-fuel mixture;

rotating a circular disc with a single cut-out opening comprising a circular sector to one or more first positions, the opening in the one or more first positions fluidically connecting a pressurized air supply with a first cylinder's exhaust port and not a second cylinder's exhaust port, and injecting air from the pressurized air supply into the first cylinder's exhaust port and not into the second cylinder's exhaust port during the first cylinder's exhaust stroke; and rotating the circular disc to one or more second positions, the cut-out opening in the one or more second positions fluidically connecting the pressurized air supply with the second cylinder's exhaust port and not the first cylinder's exhaust port, and injecting air from the pressurized air supply into the second cylinder's exhaust port and not into the first cylinder's exhaust port during the second cylinder's exhaust stroke.

2. The multi-cylinder engine method of claim 1, wherein injecting air into the first cylinder's exhaust port further comprises not injecting air into exhaust ports of other cylinders that are not undergoing an exhaust stroke, and wherein injecting air into the second cylinder's exhaust port further comprises not injecting air into exhaust ports of other cylinders that are not undergoing an exhaust stroke.

3. The multi-cylinder engine method of claim 1, wherein injecting air into the first cylinder's exhaust port further comprises injecting air into the first cylinder's exhaust port in response to a temperature of exhaust being below a threshold.

4. The multi-cylinder engine method of claim 1, wherein the rotating of the circular disc is mechanically timed to the engine's camshaft.

5. The multi-cylinder engine method of claim 4, further comprising generating the pressurized air supply by operating an air pump.

6. The multi-cylinder engine method of claim 4, further comprising generating the pressurized air supply by directing air downstream of a turbocharger compressor to an air injection system.

7. The multi-cylinder engine method of claim 1, wherein injecting air into the first cylinder's exhaust port further comprises blocking air injection into all other cylinders' exhaust ports, wherein the blocking is mechanically timed to the engine's camshaft.

8. The multi-cylinder engine method of claim 1, wherein injecting air into the second cylinder's exhaust port further comprises blocking air injection into all other cylinders' exhaust ports, wherein the blocking is mechanically timed to the engine's camshaft.

9. A multi-cylinder engine method, comprising:
combusting a rich air-fuel mixture;
rotating a circular disc with a single cut-out opening mechanically timed to the engine's camshaft so that the cut-out opening fluidically connects a pressurized air supply with a first cylinder's exhaust port, and injecting air from the pressurized air supply into the first cylinder's exhaust port only during the first cylinder's exhaust stroke; and rotating the circular disc mechanically timed to the engine's camshaft so that the cut-out opening fluidically connects the pressurized air supply with a second cylinder's exhaust port, and injecting air from the air supply into the second cylinder's exhaust port only during the second cylinder's exhaust stroke, the cut-out including a leading edge defining an angle at which the fluid connection starts.

10. The method of claim 9, wherein combusting the rich air-fuel mixture further comprises combusting the rich air-fuel mixture while operating an air pump to generate the pressurized air supply.

11. The method of claim 9, wherein combusting the rich air-fuel mixture further comprises combusting the rich air-fuel mixture while directing air downstream of a turbocharger compressor to generate the pressurized air supply.

12. The method of claim 9, wherein injecting air from the pressurized air supply into the first cylinder's exhaust port further comprises injecting air from the pressurized air supply into the first cylinder's exhaust port only during a first half of the first cylinder's exhaust stroke.

13. A system for an engine, comprising:
a first cylinder having a first exhaust port and a second cylinder having a second exhaust port, each exhaust port coupled to an exhaust including an emission control device;
a rotating disc coupled to an engine camshaft, the rotating disc comprising a single cut-out opening, the cut-out opening being a circular sector with a central angle less than 180 degrees; and
an air pump injecting air sequentially to the first and second exhaust ports, the sequential injection from the air pump controlled via the rotating disc.

14. The system of claim 13, wherein the sequential injection occurs only during rich air/fuel combustion in the engine.

15. The system of claim 13, wherein the sequential injection occurs in response to a temperature of the emission control device being below a threshold, and wherein the sequential injection occurs only during an exhaust stroke of each respective cylinder.

16. The system of claim 15, further comprising a third exhaust port coupled to the first cylinder, and wherein air is injected to both the first and third exhaust ports during the exhaust stroke of the first cylinder.

17. The system of claim 13, wherein the air pump includes a first connection coupled to the first exhaust port and a second connection coupled to the second exhaust port, and wherein the rotating disc rotates to open the first connection during injection to the first exhaust port while blocking the second connection.

18. The system of claim 17, wherein the rotating disc rotates to open the second connection during injection to the second exhaust port while blocking the first connection.

* * * * *